United States Patent
Gaughan

(10) Patent No.: US 8,049,608 B2
(45) Date of Patent: Nov. 1, 2011

(54) SYSTEM AND METHOD FOR CALCULATING ELECTRICALLY CONTROLLED PNEUMATIC (ECP) BRAKE CYLINDER PISTON TRAVEL

(75) Inventor: Edward W. Gaughan, Greensburg, PA (US)

(73) Assignee: Wabtec Holding Corp., Wilmerding, PA (US)

( * ) Notice: Subject to any disclaimer, the term of this patent is extended or adjusted under 35 U.S.C. 154(b) by 382 days.

(21) Appl. No.: 12/476,612

(22) Filed: Jun. 2, 2009

(65) Prior Publication Data
US 2010/0302021 A1 Dec. 2, 2010

(51) Int. Cl.
*B60Q 1/00* (2006.01)

(52) U.S. Cl. .............. 340/453; 303/128; 188/1.11 W; 188/1.11 R; 188/153 R; 33/609; 116/208

(58) Field of Classification Search ........... 340/453, 340/454, 438; 188/1.11 W, 1.11 R, 153 R, 188/170, 1.11 L, 1.11 E, 3 R, 21; 303/128, 303/22.6; 33/609, 613; 116/208
See application file for complete search history.

(56) References Cited

U.S. PATENT DOCUMENTS

| | | | |
|---|---|---|---|
| 5,066,940 A * | 11/1991 | Schmidt ................ | 340/453 |
| 5,492,203 A | 2/1996 | Krampitz | |
| 6,079,795 A | 6/2000 | Engle | |
| 6,082,502 A | 7/2000 | Hawryszkow | |
| 6,364,068 B1 | 4/2002 | Ring et al. | |
| 6,375,277 B1 | 4/2002 | Carroll | |
| 6,460,659 B1 * | 10/2002 | Schaffer et al. ......... | 188/1.11 W |
| 6,702,072 B2 | 3/2004 | Asano | |
| 6,904,698 B2 | 6/2005 | Halliar et al. | |
| 2005/0121971 A1 * | 6/2005 | Ring ................ | 303/7 |

\* cited by examiner

*Primary Examiner* — Brent Swarthout
(74) *Attorney, Agent, or Firm* — The Webb Law Firm

(57) ABSTRACT

A system for determining a distance of travel of a brake cylinder piston includes a brake cylinder having the brake cylinder piston, a pressure transducer operationally coupled to the brake cylinder and configured to determine a pressure measurement within the brake cylinder, and a control module of an electrically controlled pneumatic (ECP) brake control system. The control module is operationally coupled to the pressure transducer and configured to convert the pressure measurement within the brake cylinder determined by the pressure transducer into at least one of a displacement time of the brake cylinder piston, an equalization pressure within the brake cylinder, a pressure build-up time within the brake cylinder, a pressure leakage from the brake cylinder, or any combination thereof. The control module determines the distance of travel of the brake cylinder piston based on at least one of the displacement time of the brake cylinder piston, the equalization pressure within the brake cylinder, the pressure build-up time within the brake cylinder, the pressure leakage from the brake cylinder, or any combination thereof.

20 Claims, 4 Drawing Sheets

SYSTEM AND METHOD FOR CALCULATING ELECTRICALLY CONTROLLED PNEUMATIC (ECP) BRAKE CYLINDER PISTON TRAVEL

BACKGROUND OF THE INVENTION

1. Field of the Invention

This disclosure relates, in general, to a brake cylinder piston travel calculating system and, more particularly, to the use of the electrically controlled pneumatic (ECP) brake control system to determine the distance traveled by the brake cylinder piston.

2. Description of Related Art

49 C.F.R. §232.205(c) provides the tasks and requirements for a Class 1 terminal brake test for a train. Minimum brake cylinder piston travel of truck-mounted brake cylinders must be sufficient to provide proper brake shoe clearance when the brakes are released. In addition, piston travel must be inspected on each freight car while the brakes are applied. More specifically, 49 C.F.R. §232.205(c)(5) requires that "[f]or cars equipped with . . . 10-inch diameter brake cylinders, piston travel shall be within 7 to 9 inches. If piston travel is found to be less than 7 inches or more than 9 inches, it must be adjusted to nominally 7½ inches. For cars not equipped with . . . 10-inch brake cylinders, piston travel shall be within the piston travel stenciled or marked on the car or badge plate."

Freight trains typically undergo the pre-departure Class 1 terminal brake test prior to the train being cleared to proceed from the train make-up yard. Currently, such an inspection requires a trainman to "walk the train" visually checking each car's brake equipment. Prior art type truck mounted brake assemblies include a piston travel indicator attached to the brake cylinder assembly for monitoring piston travel to determine whether or not the brake equipment is functioning properly.

One type of currently used piston travel indicator comprises an indicating means, such as a flag, which moves along a measuring means. This measuring means has an acceptable operating range or zone marked thereon. The inspector views the location of the flag with respect to the acceptable operating range to determine whether or not the braking equipment is functioning properly. For example, if the flag is below the range, then this would indicate that the slack adjuster trigger needs to be adjusted. If, on the other hand, the flag is above the range, this could indicate that either the slack adjuster is out of capacity and the brake shoes are too worn or the slack adjuster is not functioning properly and requires maintenance. Due to the location of this piston travel indicator within the truck mounted brake assembly underneath the car, it is often difficult for the trainman to readily view the indicator and to make a proper determination as to the functioning of the braking equipment. Thus, it becomes burdensome to inspect the braking equipment of the train and consequently more time consuming to complete the terminal test.

An improvement to such prior art systems is disclosed in U.S. Pat. No. 6,364,068 to Ring et al. This patent describes a brake cylinder piston travel indicator that monitors an amount of piston travel in a brake cylinder assembly in a railway braking system. The railway braking system includes a brake beam and a brake cylinder piston within the brake cylinder assembly which is in engagement with an end of a brake cylinder force transfer lever. The brake cylinder piston travel indicator includes a rod member that is rotatably secured to and extends substantially parallel with at least a portion of the brake beam. A member is provided which operationally interconnects the rod member with the cylinder force transfer lever and is capable of transferring a rotational force to the rod member. This rotational force is caused by activation of the piston in the brake cylinder assembly. An indicating device is provided which is engagable with a first end of the rod member and is capable of responding to the rotation of the rod member and indicating an amount of travel of the piston during activation thereof in the brake cylinder assembly. However, this system continues to require train inspection personnel to visually inspect the brake cylinder to determine the travel distance, thereby making the system susceptible to human error.

Accordingly, a need exists for a system that automatically determines the distance traveled by the brake cylinder piston without the need for visual inspection.

SUMMARY OF THE INVENTION

As described in detail herein, a freight train's ECP brake control system may be used to automatically determine the distance traveled by the brake cylinder piston without the need for visual inspection. In one embodiment, a system for determining a distance of travel of a brake cylinder piston is disclosed that includes a brake cylinder having the brake cylinder piston, a pressure transducer operationally coupled to the brake cylinder and configured to determine a pressure measurement within the brake cylinder, and a control module of an ECP brake control system. The control module is operationally coupled to the pressure transducer and configured to convert the pressure measurement within the brake cylinder determined by the pressure transducer into at least one of a displacement time of the brake cylinder piston, an equalization pressure within the brake cylinder, a pressure build-up time within the brake cylinder, a pressure leakage from the brake cylinder, or any combination thereof. The control module determines the distance of travel of the brake cylinder piston based on at least one of the displacement time of the brake cylinder piston, the equalization pressure within the brake cylinder, the pressure build-up time within the brake cylinder, the pressure leakage from the brake cylinder, or any combination thereof.

An alarm may be provided if the distance of travel of the brake cylinder piston determined by the control module is less than or greater than a normal range of the distance of travel of the brake cylinder piston. The normal range of the distance of travel of the brake cylinder piston may be seven (7) to nine (9) inches. The alarm may be at least one of an audible alarm, a message on a display, a flashing light emitting diode (LED), a colored LED, or any combination thereof. In addition, the alarm may be different if the distance of travel of the brake cylinder piston determined by the control module is less than the normal range of the distance of travel of the brake cylinder piston than if the distance of travel of the brake cylinder piston determined by the control module is greater than the normal range of the distance of travel of the brake cylinder piston. For instance, the alarm may be a lit first color indicator if the distance of travel of the brake cylinder piston determined by the control module is less than the normal range of the distance of travel of the brake cylinder piston, and the alarm may be a lit second color indicator if the distance of travel of the brake cylinder piston determined by the control module is greater than the normal range of the distance of travel of the brake cylinder piston.

In another embodiment, a method for determining a distance of travel of a brake cylinder piston is disclosed. The method includes, for example, the steps of: providing a brake cylinder having the brake cylinder piston; determining a pressure measurement within the brake cylinder using a pressure transducer that is operationally coupled to the brake cylinder; converting the pressure measurement within the brake cylinder determined by the pressure transducer into at least one of a displacement time of the brake cylinder piston, an equalization pressure within the brake cylinder, a pressure build-up time within the brake cylinder, a pressure leakage from the brake cylinder, or any combination thereof using a control module; and determining the distance of travel of the brake cylinder piston based on at least one of the displacement time of the brake cylinder piston, the equalization pressure within the brake cylinder, the pressure build-up time within the brake cylinder, the pressure leakage from the brake cylinder, or any combination thereof using the control module.

The method may further include a step of providing an alarm if the distance of travel of the brake cylinder piston determined by the control module is less than or greater than a normal range of the distance of travel of the brake cylinder piston. The normal range of the distance of travel of the brake cylinder piston may be seven (7) to nine (9) inches. The alarm may be at least one of an audible alarm, a message on a display, a flashing LED, a colored LED, or any combination thereof. In addition, the alarm may be different if the distance of travel of the brake cylinder piston determined by the control module is less than the normal range of the distance of travel of the brake cylinder piston than if the distance of travel of the brake cylinder piston determined by the control module is greater than the normal range of the distance of travel of the brake cylinder piston. For instance, the alarm may be a lit first color indicator if the distance of travel of the brake cylinder piston determined by the control module is less than the normal range of the distance of travel of the brake cylinder piston, and the alarm may be a lit second color indicator if the distance of travel of the brake cylinder piston determined by the control module is greater than the normal range of the distance of travel of the brake cylinder piston.

A further embodiment is directed to a brake cylinder unit for an ECP brake control system. The brake cylinder unit includes a cylinder having a first end and a second end with a port for receiving compressed air, a piston inserted within the cylinder such that the piston can slide freely into and out of the open first end of the cylinder, and a pressure transducer operationally coupled to the cylinder and configured to determine a pressure measurement within the brake cylinder. A control module of the ECP brake control system is operationally coupled to the pressure transducer and configured to convert the pressure measurement within the brake cylinder determined by the pressure transducer into at least one of a displacement time of the brake cylinder piston, an equalization pressure within the brake cylinder, a pressure build-up time within the brake cylinder, a pressure leakage from the brake cylinder, or any combination thereof and determine the distance of travel of the brake cylinder piston based on at least one of the displacement time of the brake cylinder piston, the equalization pressure within the brake cylinder, the pressure build-up time within the brake cylinder, the pressure leakage from the brake cylinder, or any combination thereof.

An alarm may be provided if the distance of travel of the brake cylinder piston determined by the control module is less than or greater than a normal range of the distance of travel of the brake cylinder piston. The normal range of the distance of travel of the brake cylinder piston may be seven (7) to nine (9) inches. The alarm may be at least one of an audible alarm, a message on a display, a flashing LED, a colored LED, or any combination thereof. In addition, the alarm may be different if the distance of travel of the brake cylinder piston determined by the control module is less than the normal range of the distance of travel of the brake cylinder piston than if the distance of travel of the brake cylinder piston determined by the control module is greater than the normal range of the distance of travel of the brake cylinder piston. For instance, the alarm may be a lit first color indicator if the distance of travel of the brake cylinder piston determined by the control module is less than the normal range of the distance of travel of the brake cylinder piston, and the alarm may be a lit second color indicator the distance of travel of the brake cylinder piston determined by the control module is greater than the normal range of the distance of travel of the brake cylinder piston.

The piston may include a piston head positioned at a first end thereof and a second end that is operationally coupled to a cylinder force transfer lever. The cylinder force transfer lever may be configured to apply a braking device.

DETAILED DESCRIPTION OF THE PRESENT INVENTION

Figure 1:
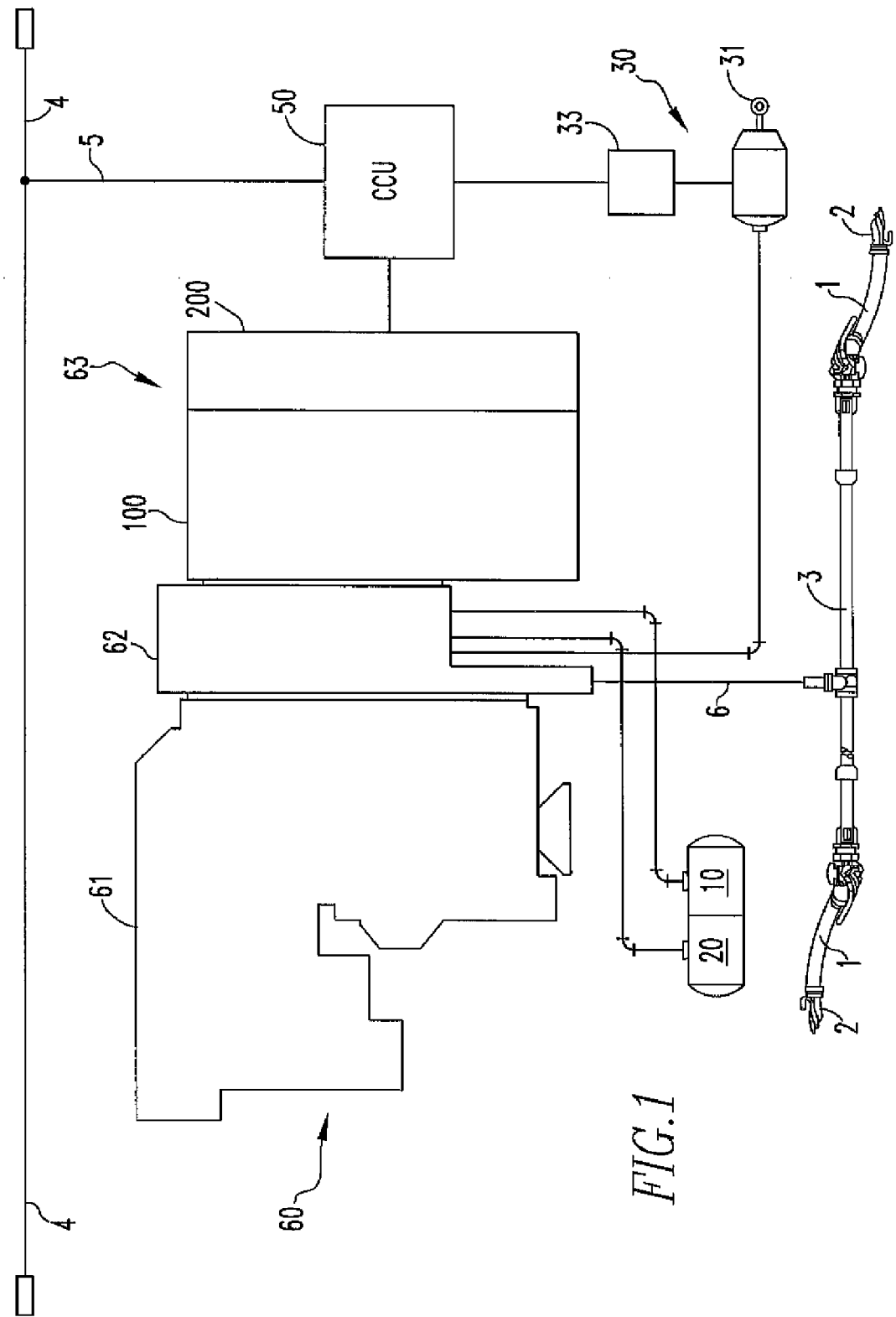
FIG. 1 is a schematic view of an electrically controlled pneumatic (ECP) brake control system for a railcar of a freight train pursuant to one embodiment.

For purposes of the description hereinafter, the spatial orientation terms, if used, and derivatives thereof shall relate to the invention as it is oriented in the drawing figures. However, it is to be understood that the invention may assume various alternative variations, except where expressly specified to the contrary. It is also to be understood that the specific devices illustrated in the attached drawings and described in the following specification, are simply exemplary embodiments of the invention. Hence, specific dimensions and other physical characteristics related to the embodiments disclosed herein are not to be considered as limiting.

A freight train typically includes one or more locomotives, a plurality of railcars and several trainlines. For a freight train headed by a locomotive equipped with an ECP brake control system, the trainlines include both pneumatic and electrical lines some of which run from the lead locomotive to the last railcar in the train. A pneumatic trainline known as the brake pipe is one such trainline. It extends the length of the freight train as does a two-wire electrical trainline known as the ECP trainline. Each locomotive also features a multi-wire electrical trainline known as the multiple unit (MU) line cable. The MU line cable has 27 different electrical lines. As is well known in the railroad industry, the MU line cable contains 74V DC power and return lines on which battery power from the locomotive is supplied to the ECP brake equipment on each railcar and to various other power consuming devices on the train.

With reference to FIG. 1, a brake pipe 3 includes a series of pipe lengths, with one pipe length secured to the underside of each railcar. Each pipe length has, at each of its ends, a flexible hose 1 with a coupler commonly referred to as a glad hand 2. As the locomotives and other rail vehicles are coupled in sequence to form the freight train, brake pipe 3 is formed by connecting glad hand 2 at the end of each pipe length to glad hand 2 of another such pipe length on an adjacent vehicle. Similar to brake pipe 3, the conduit in which an ECP trainline cable 4 is housed actually constitutes a series of individual conduits. One such conduit secured to the underside of each vehicle interconnects to another such conduit via a connector between each rail vehicle.

The ECP brake control system in the locomotive includes a cab station unit and a master controller from which the brakes on the train are ultimately controlled. The cab station unit features one or two handle(s) and/or push buttons that the train operator uses to direct control of the brakes. One such handle, known as the automatic brake handle, can be moved to and between the following positions: release, minimum service, full service, suppression, continuous service, and emergency. Between the minimum and full service positions lies the service zone wherein each incremental movement of the handle toward the fall service position causes an even stronger service application of the brakes. The force with which the brakes apply depends on how far towards the full service position the brake handle is moved.

Inputs from the handle(s) and/or push buttons are processed by the cab station unit and then passed to a master controller. Operating according to instructions contained within its programming code, and in response to the inputs from the handle(s) and other sources, the master controller formulates a brake command appropriate to current conditions and transmits it along ECP trainline cable 4 to each railcar in the freight train. Along the ECP trainline cable 4, the brake command(s) are then conveyed to the ECP brake equipment on each railcar via branch wiring 5. Similarly, in a manner known in the railroad industry, brake pipe 3 connects to the ECP brake equipment on each railcar via a branch pipe 6.

The master controller can thus order, through the brake command, any action from a release of brakes to an emergency application of brakes or any degree of brake application in between those two extremes. The brake equipment may also be designed to provide graduated release of the brakes. The degree of brake application ordered by the master controller is typically conveyed in terms of a percentage of the pressure required for full service brake application. For example, 0% is typically designated for a release of brakes, 15% for a minimum service brake application, 100% for a full service brake application, and 120% for an emergency brake application.

The ECP brake equipment on each railcar typically includes an auxiliary reservoir 10, an emergency reservoir 20, a brake cylinder unit 30 having a brake cylinder piston 31, a pressure transducer 33, a car control unit (CCU) 50, and an ECP brake control valve, denoted generally as reference numeral 60. ECP brake control valve 60 includes a pneumatic portion 61 and an electropneumatic portion, denoted generally as reference numeral 63. Pneumatic portion 61 and electropneumatic portion 63 are typically mounted to opposite sides of a pipe bracket 62. Pneumatic portion 61 may take the form of an emergency portion of a brake control valve such as an ABD, ABDX, or ABDW type valve made by the Westinghouse Air Brake Technologies Corporation (WABTEC). Electropneumatic portion 63 includes a manifold 100, several pressure transducers, and several solenoid-operated application and release valves. The transducers and solenoid valves are collectively designated by section 200. Manifold 100 defines several ports to which the transducers and solenoid valves connect. It also defines a number of internal passages, which communicate with passages internal to pipe bracket 62.

Each port of pipe bracket 62 connects to one of the interconnecting pipes on the railcar such as those leading to brake pipe 3, the auxiliary reservoir 10, the emergency reservoir 20, and brake cylinder 30. It is through the internal passages of pipe bracket 62 that the various portions of the brake equipment communicate fluidly with the pneumatic piping on the railcar. Pressure transducer 33 is provided to monitor the pressure of brake cylinder unit 30. Pressure transducer 33 conveys electrical signals indicative of brake cylinder pressures to CCU 50.

Each CCU 50 includes a transceiver and a microprocessor. The transceiver, which is controlled by the microprocessor, is connected via branch wiring 5 to ECP trainline cable 4 from which it receives the brake commands issued by the master controller. The transceiver converts the electrical brake commands into a form usable by the microprocessor. Operating according to its programming code and to the dictates of the brake commands and other electrical signals it has received, the microprocessor controls the application and release valves in a manner well known in the brake control art. It is through the solenoid valves that air can be maintained within, exhausted from, or directed from either or both of the reservoirs to the brake cylinder unit 30.

By moving the automatic brake handle into service zone, for example, the train operator in the locomotive will cause the ECP brake control system to issue a service brake command along ECP trainline cable 4. In response to the service brake command, the microprocessor on each railcar will then energize the application valve(s) for the appropriate time. This enables the appropriate amount of air to flow from auxiliary reservoir 10 and/or emergency reservoir 20 via pipe bracket 62 and manifold 100 through the application valve(s) ultimately to brake cylinder unit 30. Similarly, in response to the brake handle having been moved into the release position, the ECP brake control system will issue a release brake command along ECP trainline cable 4. In response to this command, each microprocessor will then energize the release valve(s) on its railcar. Air from brake cylinder unit 30 will then flow via pipe bracket 62 and manifold 100 through the release valve(s) to the atmosphere, thus depressurizing brake cylinder unit 30 and releasing the brakes on the railcar.

In addition, as a safety measure, emergency brake commands are conveyed to the railcars not only electrically along ECP trainline 4 but also pneumatically along brake pipe 3. By moving the handle into the emergency position, the train operator in the locomotive causes the pressure in brake pipe 3 to drop at an emergency rate. This drop in pressure eventually propagates along brake pipe 3 to each railcar in the train. Should CCU 50 and/or electropneumatic portion 63 lose power or otherwise fail, emergency portion 61 of brake control valve 60 will still respond pneumatically to the telltale reduction in pressure that occurs in brake pipe 3 during an emergency. Emergency portion 61 is designed to respond to the emergency pressure drop by supplying pressurized air from both reservoirs 10 and 20 to brake cylinder unit 30, thereby causing an emergency application of the brakes.

Figure 2A:
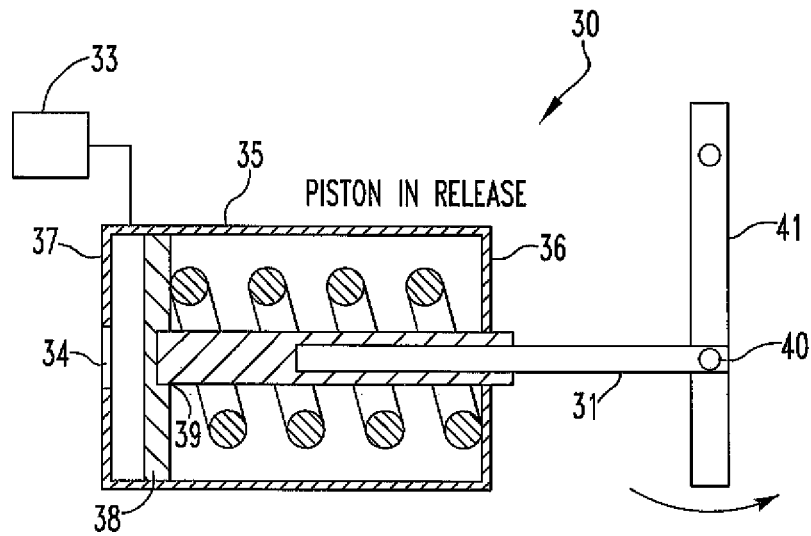
FIGS. 2A and 2B are schematic cross-sectional views of a brake cylinder unit provided in the ECP brake control system of FIG. 1.
Figure 2B:
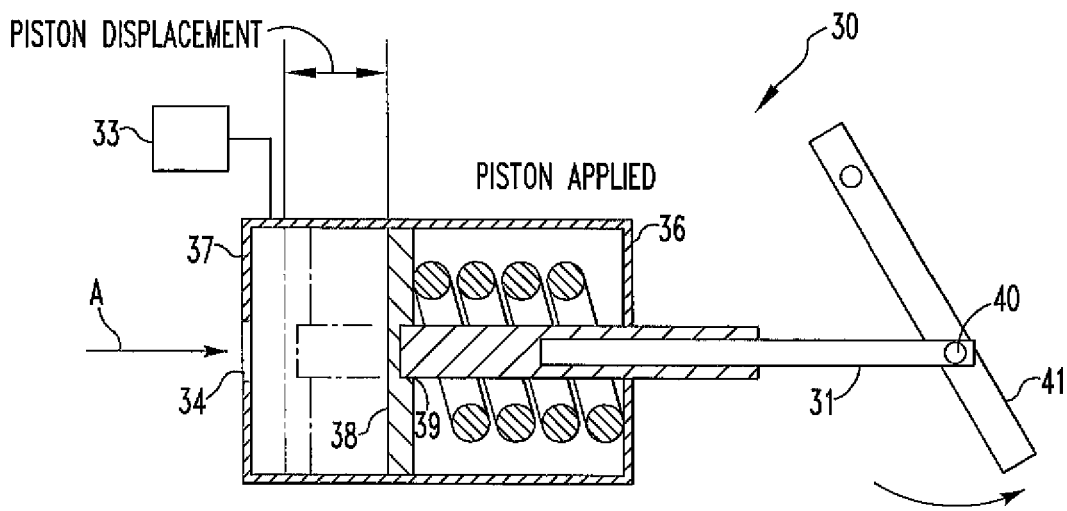

With further reference to FIGS. 2A and 2B, brake cylinder unit 30 includes a cylinder 35 having a first end 36 and a second end 37 with a port 34 for receiving compressed air A. Brake cylinder unit 30 also includes a piston 31 inserted within cylinder 35 such that piston 31 can slide freely into and out of first end 36 of cylinder 35 and a pressure transducer 33 operationally coupled to cylinder 35 and configured to determine a pressure measurement within cylinder 35. Piston 31 includes a piston head 38 positioned at a first end 39 thereof and a second end 40 that is operationally coupled to a cylinder force transfer lever 41. Cylinder force transfer lever 41 is configured to apply a braking device (not shown) of the railcar when piston 31 is applied.

In operation, when a braking signal is requested, compressed air A is supplied to port 34 at second end 37 of cylinder 35. Brake cylinder unit 30 converts compressed air A to mechanical force. This mechanical force is transmitted by piston 31 to cylinder force transfer lever 41 and then to the brake shoes of the braking device. Forced against the wheels and/or disc brakes, the brake shoes are used to slow or stop the rotation of the wheels. The magnitude of the braking force applied to the wheels is directly proportional to the pressure built up in brake cylinder unit 30. A spring 42 is provided to return piston 31 to its original position when compressed air A is not supplied to cylinder 35, thereby releasing the braking device.

Figure 3:
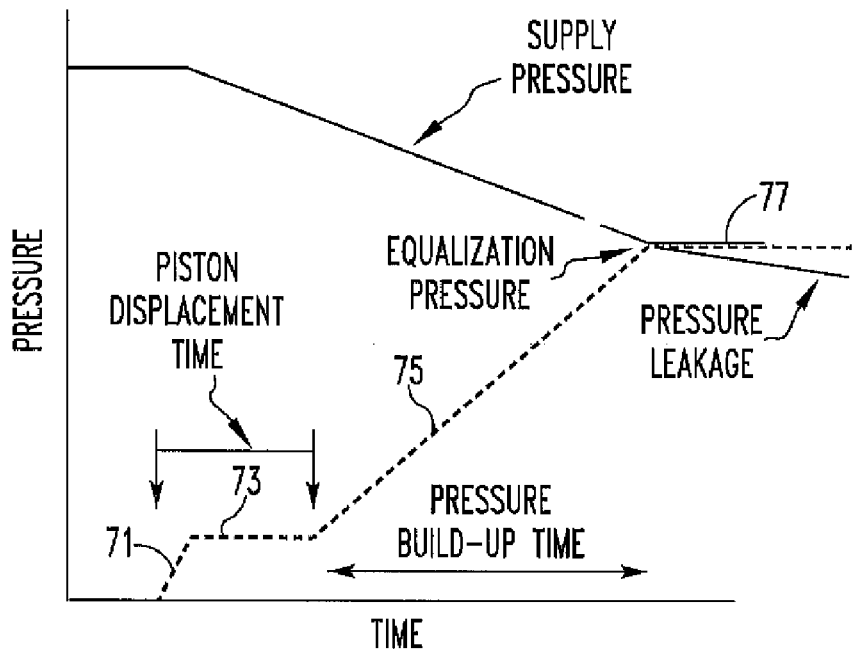
FIG. 3 is a graph of pressure versus time illustrating the pressure build-up within the brake cylinder unit of FIGS. 2A and 2B.

With further reference to FIG. 3, pressure changes within cylinder 35 of brake cylinder 31 as determined by pressure transducer 33 when compressed air A is supplied to cylinder 35 are illustrated as a graph of pressure versus time. When compressed air A is initially supplied to cylinder 35 via port 34, pressure within cylinder 35 begins to build up for a short period of time as denoted by segment 71 until the pressure is great enough to move piston 31. Once the pressure has reached this point, piston 31 is displaced for a period of time as denoted by segment 73. During this time, the pressure within cylinder 35 remains at a relatively constant level. After piston 31 has been fully displaced, the pressure within cylinder 35 begins to increase until an equalization pressure is reached as shown by segment 75. This period of time is known as the pressure build-up time. Finally, once the equalization pressure is reached, the pressure within cylinder 35 again tapers off to a steady level as shown by segment 77.

The different pressure values as determined by pressure transducer 33 at different times can be used to calculate the distance of travel of piston 31. For example, the equalization pressure is a pressure that is indicative of the volume of cylinder 35. Accordingly, it is known that the equalization pressure for 8 inches of piston travel with a 2500 cubic inch reservoir is approximately 65-psi. Therefore, if pressure transducer 33 determines that the equalization pressure is less than 65-psi, then piston travel is more than 8 inches and if pressure transducer 33 determines that the equalization pressure is greater than 65-psi, then piston travel is less than 8 inches. This calculation can be further refined by taking piston displacement time, pressure build-up time, and pressure leakage into account. As discussed above, the pressure build-up time is the time from final piston displacement until the equalization pressure is reached. This time is indicative of the volume of cylinder 35. In addition, pressure leakage occurs causing the pressure within cylinder 35 to slowly decrease over a predetermined period of time. The amount of leakage can be taken into consideration to provide a more accurate piston travel estimation.

Figure 4:
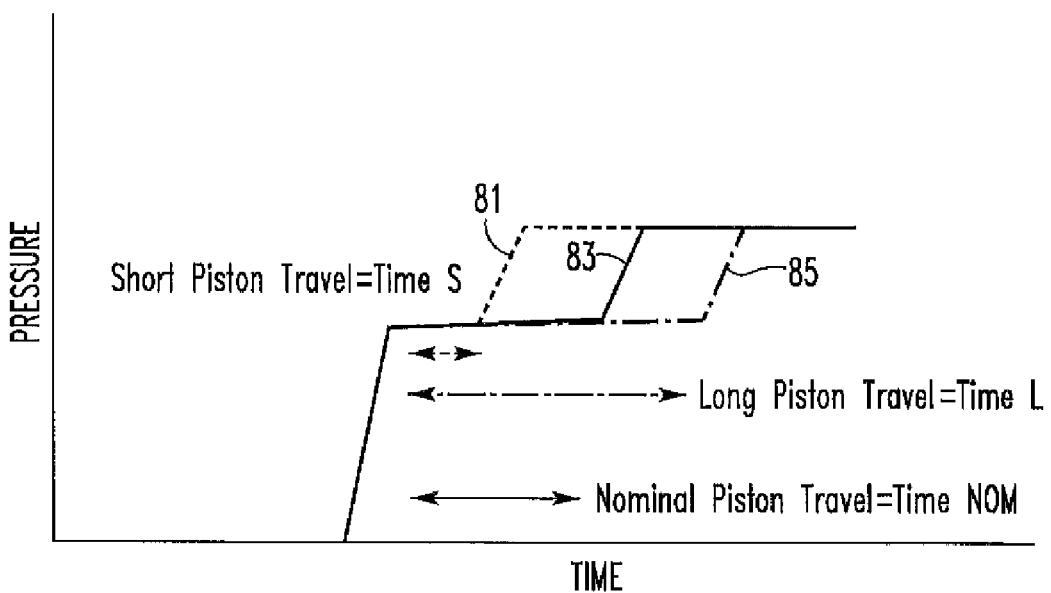
FIG. 4 is a graph of pressure versus time illustrating the pressure build-up within the brake cylinder unit of FIGS. 2A and 2B when piston travel is short, normal, and long.
Figure 5:
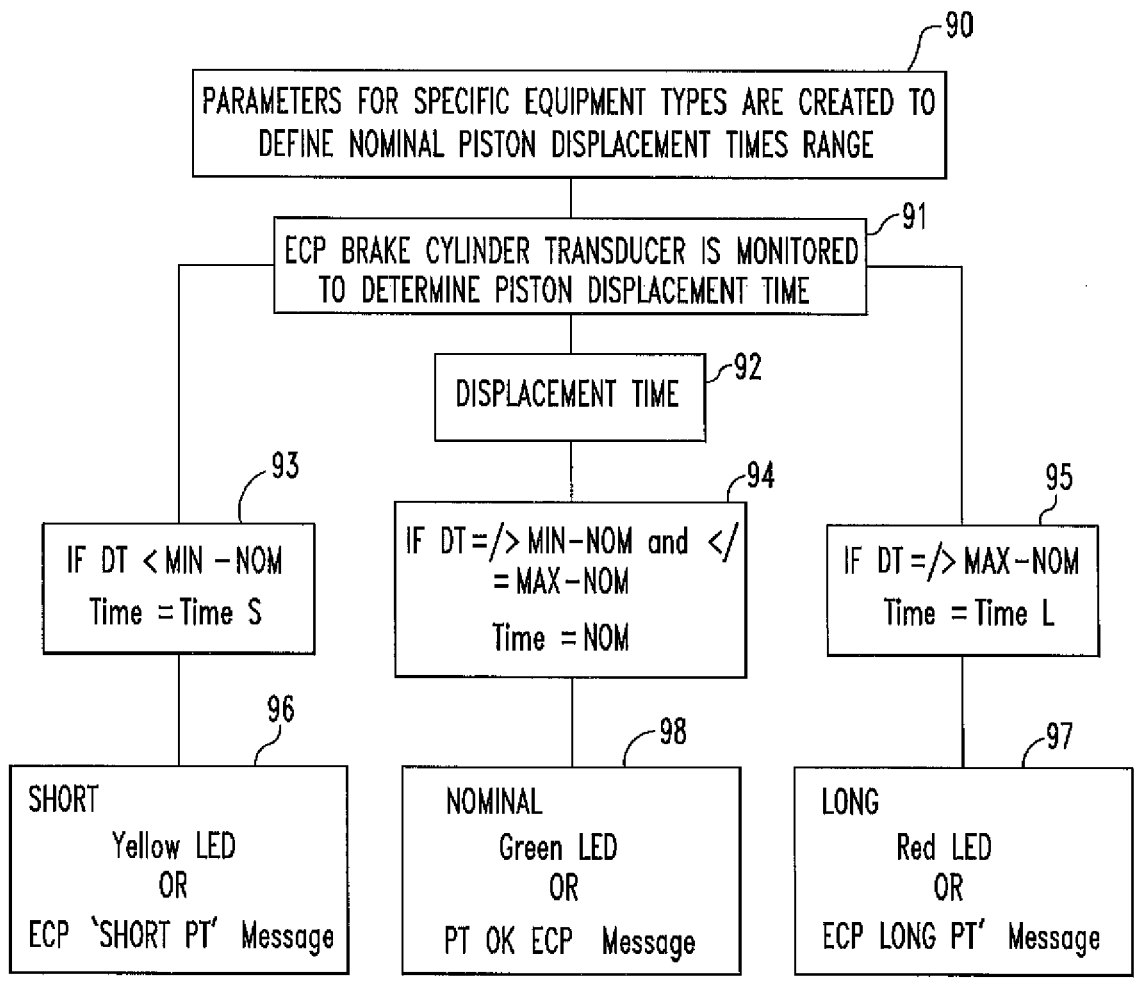
FIG. 5 is a flow chart illustrating the steps used to determine brake cylinder piston travel based on displacement time of the piston in the ECP brake control system of FIG. 1.

With reference to FIGS. 4 and 5, an example of using piston displacement time to determine the distance of travel of piston 31 is discussed in greater detail. FIG. 4 is a graph of pressure versus time showing a first plot 81 where the piston displacement time is less than a nominal piston displacement time (Time S), a second plot 83 illustrating a nominal piston displacement time (Time NOM), and a third plot 85 where the piston displacement time is greater than a nominal piston displacement time (Time L).

With specific reference to FIG. 5, a method of determining the distance of travel of piston 31 using piston displacement time measurements in accordance with an exemplary embodiment is discussed. First, at block 90, parameters of the specific type of brake cylinder unit 30 are used to determine and define nominal piston displacement time range (MIN-NOM to MAX-NOM). These piston displacement time ranges correspond to piston displacements within the allowable range of 7 to 9 inches as provided by the Class 1 terminal brake test. Next, at block 91, a pressure measurement over a period of time is determined within cylinder 35 using pressure transducer 33. Thereafter, at block 92, this pressure measurement is sent to CCU 50 where it is converted to a displacement time (DT) of the brake cylinder piston 31. Then, at blocks 93 through 95, CCU 50 determines the distance of travel of brake cylinder piston 31 based on the displacement time of the brake cylinder piston 31. For example, CCU 50 compares the displacement time (DT) determined at block 92 to the nominal piston displacement time range (MIN-NOM to MAX-NOM). If the displacement time (DT) is less than the lower value (MIN-NOM) of the nominal piston displacement time range, it is determined at block 93 that the piston displacement time is less than a nominal piston displacement time (Time S) and, therefore, the distance of travel of piston 31 is less than 7 inches. Accordingly, at block 96, an alarm is provided to alert the operator that the distance of travel of brake cylinder piston 31 determined by CCU 50 is less than a normal range (e.g., 7 to 9 inches) of the distance of travel of the brake cylinder piston. The alarm may be any suitable alarm such as an audible alarm, a message on a display, a flashing LED, a colored LED (e.g., a color indicator), or any combination thereof. Specifically, if the distance of travel of brake cylinder piston 31 is less than 7 inches, the alarm may be a lit yellow LED or a message on a display saying "SHORT PT".

If the displacement time (DT) is greater than the upper value (MAX-NOM) of the nominal piston displacement time range, it is determined at block 95 that the piston displacement time is greater than a nominal piston displacement time (Time L) and therefore the distance of travel of piston 31 is greater than 9 inches. Accordingly, at block 97, an alarm is provided to alert the operator that the distance of travel of brake cylinder piston 31 determined by CCU 50 is greater than a normal range (e.g., 7 to 9 inches) of the distance of travel of the brake cylinder piston. The alarm may be any suitable alarm such as an audible alarm, a message on a display, a flashing LED, a colored LED, or any combination thereof. Specifically, if the distance of travel of brake cylinder piston 31 is determined to be greater than 9 inches, the alarm may be a lit red LED or a message on a display saying "LONG PT".

Finally, if the displacement time (DT) is determined to be within the lower value and the upper value (MIN-NOM to MAX-NOM) of the nominal piston displacement time range, it is determined at block 94 that the piston displacement time is equal to a nominal piston displacement time (Time NOM) and, therefore, the distance of travel of piston 31 is between 7 to 9 inches. Accordingly, at block 97, an alarm is provided to alert the operator that the distance of travel of brake cylinder piston 31 determined by CCU 50 is within an acceptable range. The alarm may be a lit green LED or a message on a display saying "PT OK".

Please note that this example is not to be construed as limiting as any number of parameters, such as an equalization pressure within the brake cylinder, a pressure build-up time within the brake cylinder, a pressure leakage from the brake cylinder, or any combination of these parameters may be used to determine brake cylinder piston travel. In addition, the above examples discussed a piston travel range of 7 to 9 inches. However, this is not to be construed as limiting the present invention as different systems have different acceptable piston travel ranges. For instance, some truck mounted systems have an acceptable piston travel range of 1.75 to 3 inches.

Although the present invention has been described in detail for the purpose of illustration based on what is currently considered to be the most practical embodiments, it is to be understood that such detail is solely for that purpose and that the invention is not limited to the disclosed embodiments but, on the contrary, is intended to cover modifications and equivalent arrangements. For example, it is to be understood that the present invention contemplates that, to the extent possible, one or more features of any embodiment can be combined with one or more features of any other embodiment.

The invention claimed is:

1. A system for determining a distance of travel of a brake cylinder piston, comprising:
   a brake cylinder having a brake cylinder piston;
   a pressure transducer operationally coupled to the brake cylinder and configured to determine a pressure measurement within the brake cylinder; and
   a control module of an electrically controlled pneumatic (ECP) brake control system operationally coupled to the pressure transducer and configured to convert the pressure measurement within the brake cylinder determined by the pressure transducer into at least one of a displacement time of the brake cylinder piston, an equalization pressure within the brake cylinder, a pressure build-up time within the brake cylinder, a pressure leakage from the brake cylinder, or any combination thereof,
   wherein the control module determines the distance of travel of the brake cylinder piston based on at least one of the displacement time of the brake cylinder piston, the equalization pressure within the brake cylinder, the pressure build-up time within the brake cylinder, the pressure leakage from the brake cylinder, or any combination thereof.

2. The system of claim 1, wherein an alarm is provided if the distance of travel of the brake cylinder piston determined by the control module is less than or greater than a normal range of the distance of travel of the brake cylinder piston.

3. The system of claim 2, wherein the normal range of the distance of travel of the brake cylinder piston is seven (7) to nine (9) inches.

4. The system of claim 2, wherein the alarm is at least one of: an audible alarm, a message on a display, a flashing light emitting diode (LED), a colored LED, or any combination thereof.

5. The system of claim 2, wherein the alarm is different if the distance of travel of the brake cylinder piston determined by the control module is less than the normal range of the distance of travel of the brake cylinder piston than if the distance of travel of the brake cylinder piston determined by the control module is greater than the normal range of the distance of travel of the brake cylinder piston.

6. The system of claim 5, wherein the alarm is a lit first color indicator if the distance of travel of the brake cylinder piston determined by the control module is less than the normal range of the distance of travel of the brake cylinder piston, and the alarm is a lit second color indicator if the distance of travel of the brake cylinder piston determined by the control module is greater than the normal range of the distance of travel of the brake cylinder piston.

7. A method for determining a distance of travel of a brake cylinder piston, the method comprising the steps of:
   providing a brake cylinder having the brake cylinder piston;
   determining a pressure measurement within the brake cylinder using a pressure transducer that is operationally coupled to the brake cylinder;
   converting the pressure measurement within the brake cylinder determined by the pressure transducer into at least one of a displacement time of the brake cylinder piston, an equalization pressure within the brake cylinder, a pressure build-up time within the brake cylinder, a pressure leakage from the brake cylinder, or any combination thereof using a control module; and
   determining the distance of travel of the brake cylinder piston based on at least one of the displacement time of the brake cylinder piston, the equalization pressure within the brake cylinder, the pressure build-up time within the brake cylinder, the pressure leakage from the brake cylinder, or any combination thereof using the control module.

8. The method of claim 7, further comprising the step of: providing an alarm if the distance of travel of the brake cylinder piston determined by the control module is less than or greater than a normal range of the distance of travel of the brake cylinder piston.

9. The method of claim 8, wherein the normal range of the distance of travel of the brake cylinder piston is seven (7) to nine (9) inches.

10. The method of claim 8, wherein the alarm is at least one of: an audible alarm, a message on a display, a flashing LED, a colored LED, or any combination thereof.

11. The method of claim 8, wherein the alarm is different if the distance of travel of the brake cylinder piston determined by the control module is less than the normal range of the distance of travel of the brake cylinder piston than if the distance of travel of the brake cylinder piston determined by the control module is greater than the normal range of the distance of travel of the brake cylinder piston.

12. The method of claim 8, wherein the alarm is a lit first color indicator if the distance of travel of the brake cylinder piston determined by the control module is less than the normal range of the distance of travel of the brake cylinder piston, and the alarm is a lit second color indicator if the distance of travel of the brake cylinder piston determined by the control module is greater than the normal range of the distance of travel of the brake cylinder piston.

13. A brake cylinder unit for an electrically controlled pneumatic (ECP) brake control system, comprising:
   a cylinder having a first end and a second end, the second end having a port for receiving compressed air;
   a piston inserted within the cylinder such that the piston can slide freely into and out of the first end of the cylinder; and
   a pressure transducer operationally coupled to the cylinder and configured to determine a pressure measurement within the brake cylinder,
   wherein a control module of the ECP brake control system is operationally coupled to the pressure transducer and configured to convert the pressure measurement within the brake cylinder determined by the pressure transducer into at least one of a displacement time of the brake cylinder piston, an equalization pressure within the brake cylinder, a pressure build-up time within the brake cylinder, a pressure leakage from the brake cylinder, or any combination thereof and determine the distance of travel of the brake cylinder piston based on at least one of the displacement time of the brake cylinder piston, the equalization pressure within the brake cylinder, the pressure build-up time within the brake cylinder, the pressure leakage from the brake cylinder, or any combination thereof.

14. The brake cylinder unit of claim 13, wherein an alarm is provided if the distance of travel of the brake cylinder piston determined by the control module is less than or greater than a normal range of the distance of travel of the brake cylinder piston.

15. The brake cylinder unit of claim 14, wherein the normal range of the distance of travel of the brake cylinder piston is seven (7) to nine (9) inches.

16. The brake cylinder unit of claim 14, wherein the alarm is at least one of: an audible alarm, a message on a display, a flashing LED, a colored LED, or any combination thereof.

17. The brake cylinder unit of claim 14, wherein the alarm is different if the distance of travel of the brake cylinder piston determined by the control module is less than the normal range of the distance of travel of the brake cylinder piston than if the distance of travel of the brake cylinder piston determined by the control module is greater than the normal range of the distance of travel of the brake cylinder piston.

18. The brake cylinder unit of claim 17, wherein the alarm is a lit first color indicator if the distance of travel of the brake cylinder piston determined by the control module is less than the normal range of the distance of travel of the brake cylinder piston, and the alarm is a lit second color indicator if the distance of travel of the brake cylinder piston determined by the control module is greater than the normal range of the distance of travel of the brake cylinder piston.

19. The brake cylinder unit of claim 13, wherein the piston comprises a piston head positioned at a first end thereof and a second end that is operationally coupled to a cylinder force transfer lever.

20. The brake cylinder unit of claim 19, wherein the cylinder force transfer lever is configured to apply a braking device.

* * * * *